BI-PLEX STEREOPHONIC RECORDING AND REPRODUCING SYSTEM

Filed April 16, 1958 3 Sheets-Sheet 1

INVENTOR.
Adrian L. DeRosa
BY Victor J. Evans & Co.
ATTORNEYS

Jan. 23, 1962 A. L. DE ROSA 3,018,335

BI-PLEX STEREOPHONIC RECORDING AND REPRODUCING SYSTEM

Filed April 16, 1958 3 Sheets-Sheet 2

INVENTOR.

Adrian L. DeRosa

BY Victor J. Evans & Co.

ATTORNEYS

INVENTOR.
Adrian L. DeRosa
BY Victor J. Evans & Co.
ATTORNEYS 3,018,335

BI-PLEX STEREOPHONIC RECORDING AND REPRODUCING SYSTEM

Adrian L. De Rosa, 1809 Missouri Ave., Las Cruces, N. Mex.

Filed Apr. 16, 1958, Ser. No. 728,915
3 Claims. (Cl. 179—100.11)

This invention relates to a stereophonic bi-plexing system.

The object of the invention is to provide a stereophonic bi-plexing system which uses conventional single track transverse disc cutting techniques, and wherein the stereophonic reproducing portion of the system utilizes a single conventional monaural phonograph pickup head having a single stylus.

Another object of the invention is to provide a stereophonic bi-plexing system wherein only one standard monaural preamplifier is required with tone, volume, and roll-off controls common to both channels, and wherein the stereophonic tape recording and reproducing utilizes only one half the tape width of present stereophonic tape recordings so as to provide twice the playing time of the present tape recordings of equivalent area and tape speed.

A still further object of the invention is to provide a stereophonic bi-plexing system, wherein only one standard type of tape head and preamplifier is required in recording or reproducing with all controls common to both channels, and wherein economical stereophonic sound on film is provided since no physical modifications are required of the sound pick-off devices presently used or to the recording medium of the film.

A still further object of the invention is to provide a system wherein FM stations in transmitting a recording made according to the system of the present invention can transmit both channels over a common carrier without need for additional band width as compared with present methods which require two transmitters and two receivers, one for each audio channel, and wherein the system utilizes standard components.

A further object of the invention is to provide a stereophonic bi-plexing system which is extremely simple and inexpensive to manufacture, or fabricate.

Other objects and advantages will be apparent during the course of the following description.

In the accompanying drawings, forming a part of this application, and in which like numerals are used to designate like parts throughout the same:

Figure 1:
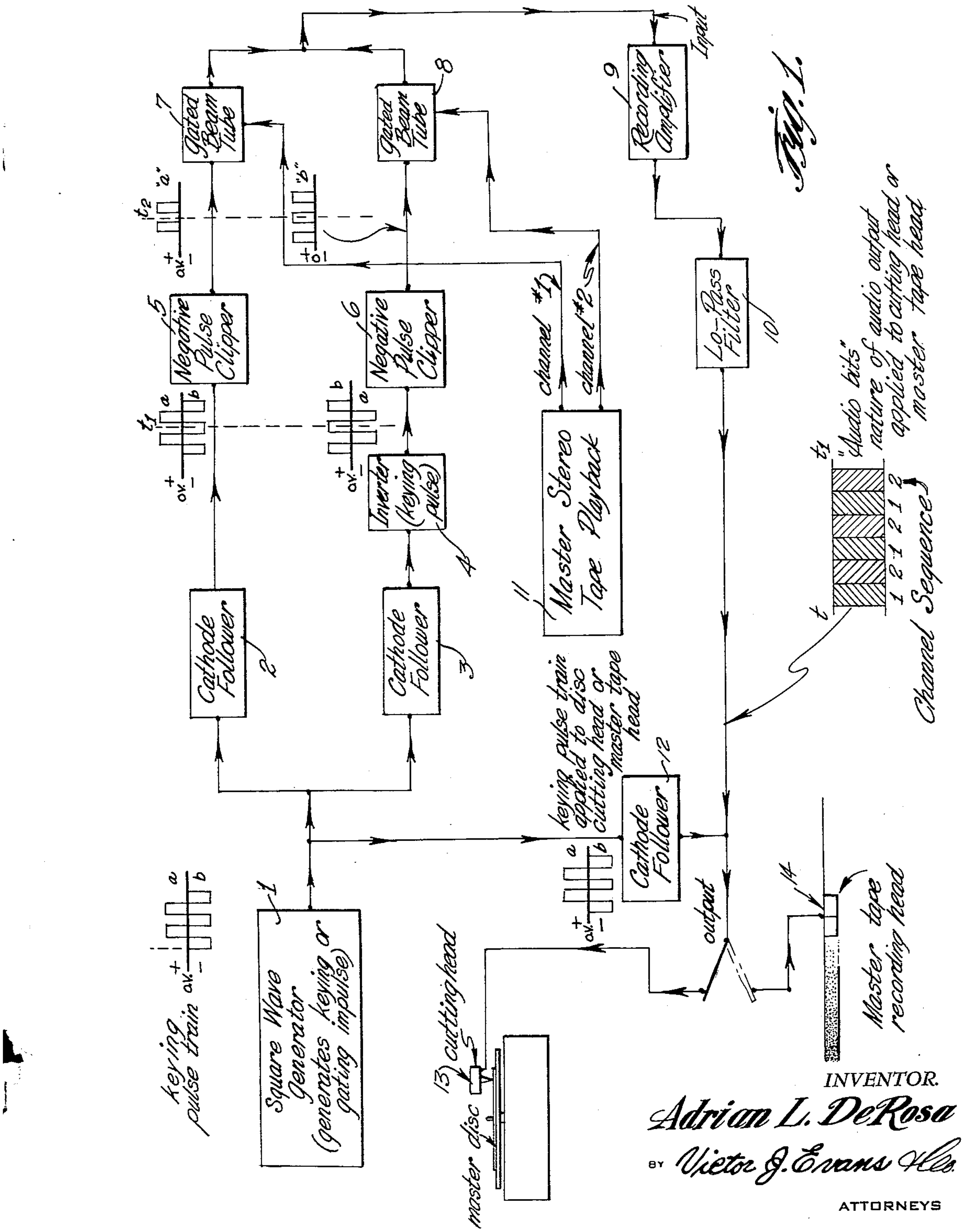
FIGURE 1 is a view illustrating schematically the recording system.

Referring in detail to the drawings, and more particularly to FIGURE 1 of the drawings, the numeral 1 indicates a square wave generator which generates keying or gating impulses, and the numerals 2 and 3 indicate first and second cathode followers which are connected in parallel one to the other, and as shown in FIGURE 1, the cathode followers 2 and 3 are connected in series to the output of the square wave generator 1. An inverter (keying pulse) 4 is connected to the output of the cathode follower 3, and a negative pulse clipper 5 is connected to the output of the cathode follower 2. A negative pulse clipper 6 is connected to the inverter 4, and a first gated beam tube 7 is connected to the output of the negative pulse clipper 5. The numeral 8 indicates a gated beam tube which is connected to the output of the negative pulse clipper 6.

As shown in the drawings, the pair of gated beam tubes

7 and 8 are arranged so that their output is fed to a single recording amplifier 9, and the output of the recording amplifier 9 is fed to a low pass filter 10. The numeral 11 indicates a master stereo tape reproducer which has its output fed to the pair of gated beam tubes 7 and 8. A cathode follower 12 is connected to the output of the square wave generator 1, and the cathode follower 12 is also connected to the output of the low pass filter 10. The numeral 13 indicates a master disc cutting head, and the numeral 14 indicates a master tape recording head.

Figure 2:
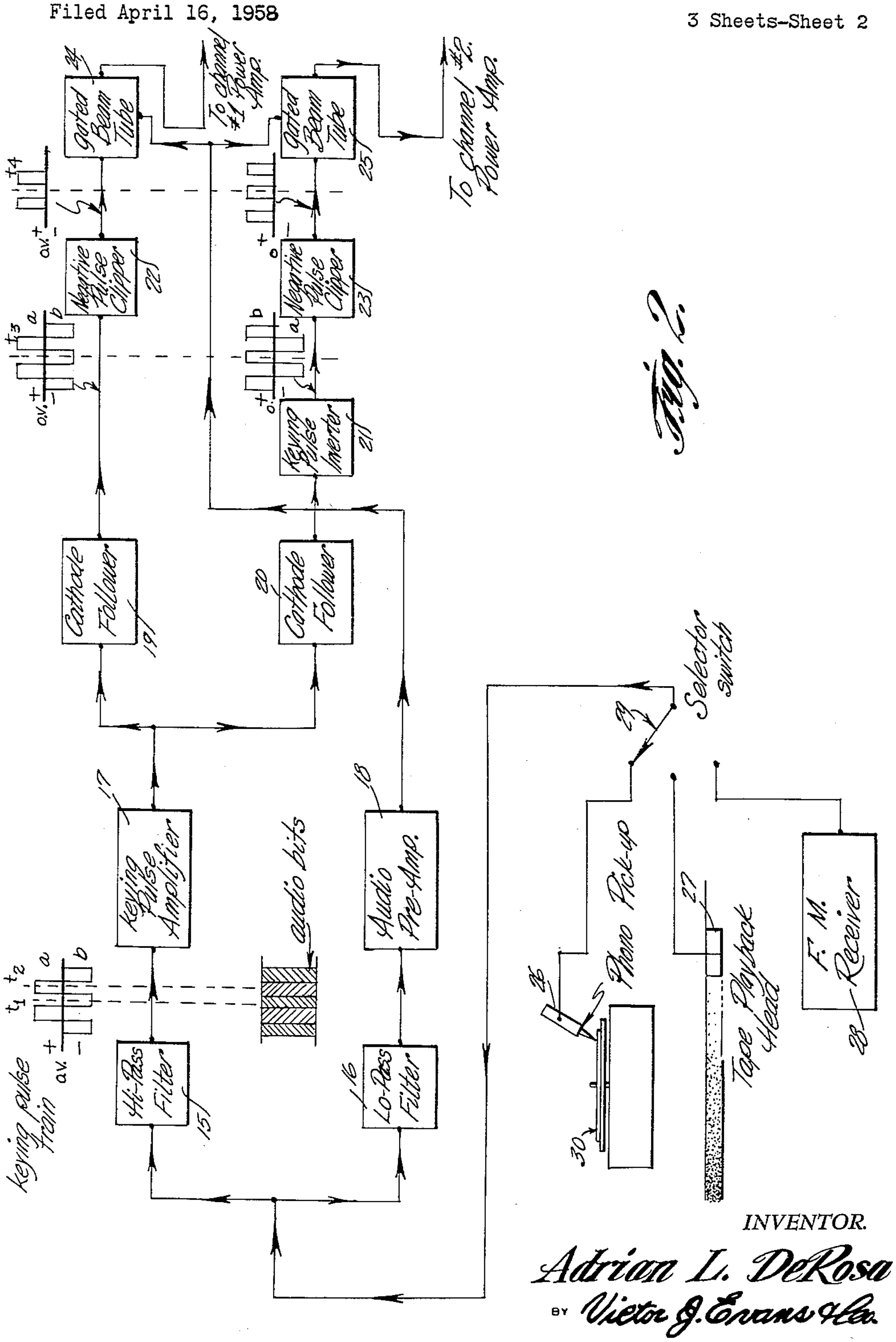
FIGURE 2 is a view similar to FIGURE 1 but illustrating the reproducing arrangement.

Referring now to FIGURE 2 of the drawings, there is illustrated schematically by block diagram, the reproducing system. Thus, in FIGURE 2 the numerals 15 and 16 designate high pass and low pass filters which are connected in parallel one to the other. The high pass filter 15 is connected to a keying pulse amplifier 17, and the low pass filter 16 is connected to an audio preamplifier 18.

A pair of cathode followers 19 and 20 are connected in parallel one to the other, and the pair of cathode followers 19 and 20 are connected in series to the output of the keying pulse amplifier 17. A keying pulse inverter 21 is connected to the cathode follower 20, and a negative pulse clipper 22 is connected to the cathode follower 19. A negative pulse clipper 23 is connected to the keying pulse inverter 21, and a gated beam tube 24 is connected to the negative pulse clipper 22. A gated beam tube 25 is connected to the negative pulse clipper 23.

The numeral 26 indicates a phonograph pickup, while the numeral 27 indicates a tape reproducing head, the numeral 28 indicates an FM receiver, and the units 26, 27 and 28 are electrically connected to a selector switch 29, while the numeral 30 indicates a disc recording.

From the foregoing, it will be seen that there has been provided a stereophonic bi-plexing system wherein according to the present invention, there will be eliminated the dual component requirements of present stereophonic techniques by presenting to the ear the information contained in each of the two channels sequentially or alternately with respect to time at a rate which exceeds the threshold of auditory persistence. Thus the audio information of each of the two channels share in common for alternate periods of time those components which normally are duplicated in conventional stereophonic systems, which present both channels continuously and simultaneously to the ear.

In essence, the system records on the recording medium, either tape or disc, a keying or gating pulse in addition to and simultaneously with the audio information normally recorded. Furthermore, the audio information is recorded uniquely in the form of sequential audio bits, and each audio bit has a time duration equal to the width of the keying or gating pulse in microseconds, the width of the keying pulse being a function of the gating or keying frequency used. The system can be compared to the multiplexing of telephone conversations which consist of audio bits and thus on a time sharing basis permit many conversations over a common cable. However, in the stereophonic system disclosed herein the effect is enhanced in view of the fact that the auditory stimulus is effectively continuous and uninterrupted by virtue of the fact that either one of the two channels is active at any given period of time. The relation with respect to time of any particular audio bit and its associated keying pulse is fixed in the recording medium. The recording therefore provides the keying pulse reference and both channels of audio information.

The first criterion in selecting the keying frequency is that the keying frequency selected when doubled, shall exceed the threshold of auditory persistence, and this frequency is in the order of 18 kilocycles. However, in the proposed system the negative portion of the keying pulse cycle is inverted and interlaced with the positive portion during both recording and reproducing so as to effectively provide a switching rate double that of the keying frequency used. Thus, from the foregoing it is apparent that a keying frequency of 9 kilocycles will alternate or switch channels at a rate of 18,000 times per second.

The second criterion in selecting the keying frequency is the maximum audio frequency it is desired to record on the audio information channels, since the keying frequency must exceed the highest audio frequency recorded in the information portion of the recording with a frequency separation sufficiently broad to separate the keying pulse from the audio information. Thus, a keying frequency of 15 kilocycles will permit a maximum audio frequency of approximately 13 kilocycles and a switching rate of 30,000 times per second. Switching rates within or greater than the foregoing limits can be used depending upon the need and/or advances in the art of recording with respect to upper frequency limits.

Referring now to FIGURE 1 of the drawings, there is shown a block diagram for the recording wherein the output of the keying or square wave generator 1 is fed through the cathode follower 12 to the cutting head 13 or master tape head 14, depending upon which type of recording medium is used or desired. The same keying pulses are also fed simultaneously to cathode followers 2 and 3. The keying pulse appearing on the output of cathode follower 2 passes through a clipping circuit 5 which removes the negative portion of the pulse cycle and presents the positive portion of the pulse cycle to the screen element of the gated beam tube 7.

The keying pulse which appears at the output of the cathode follower 3 passes through an inverter stage 4, and the pulse is inverted so that the portion of the pulse cycle which originally comprised the negative part of the cycle is now positive and conversely, that portion of the pulse cycle which originally comprised the positive part of the cycle is now negative. This inverted pulse cycle is passed through clipping circuit 6 which removes the now negative portion of the pulse cycle.

The output of the clipping circuit 6 which comprises a positive pulse is applied to the screen element of the gated beam tube 8 but displaced in time with respect to the pulse applied to the screen element of the gated beam tube 7. This time displacement is closely equivalent to one pulse width of the keying frequency used. Simultaneously with the foregoing events, the output of each of the two audio channels comprising the stereophonic recording being played back on a conventional tape playback unit 11 is applied simultaneously and respectively to the control grid elements of the gated beam tubes 7 and 8. The design of these tubes is such that an output from the plate element will occur only when positive voltages appear simultaneously on the screen and grid elements so that the audio output of channel #1 emanating from the master tape playback 11 will appear as an audio output voltage from the gated beam tube 7 only when a keying pulse simultaneously appears on the screen element of the same tube.

When the duration of the keying pulse expires, the audio output from the plate of the beam tube 7 will cease, but a keying pulse will then appear on the screen of the gated beam tube 8 which simultaneously and continuously is having the audio voltage of channel #2 emanating from the master stereo playback 11 applied to its control grid element so as to produce an audio output from the plate element of the beam tube 8. In this manner, alternate audio outputs are produced from the gated beam tubes 7 and 8 alternately and sequentially in time at a rate and duration determined by the keying pulse frequency. The output of the gated beam tubes 7 and 8 which are now in the form of audio bits represent the sequential alternate audio outputs of channels #1 and #2 respectively.

These audio bits are applied to the input of a conventional recording amplifier 9, amplified, and then passed through the low pass filter 10 which limits the output to the maximum frequency desired commensurate with the keying frequency. The output of the low pass filter 10 is then applied either to the master disc cutting head 13 or to the tape recording head 14. Thus, the audio information and the keying pulses are recorded simultaneously on the recording medium.

It is to be noted that stereophonic live programs can directly be recorded in the proposed manner by substituting microphones and associated amplifiers for the master stereo reproducer 11 and feeding the output of each microphone amplifier to the respective grids of beam power tubes 7 and 8.

Referring now to FIGURE 2 of the drawings, there is illustrated the reproducing arrangement. Thus, the selector switch 29 selects any one of the outputs of the disc recording 30, or tape playback head 27, or FM receiver 28, the first two being recordings made in the manner disclosed herein and the latter receiving an FM carrier modulated by a recording made in the manner disclosed herein, which is applied simultaneously to the high pass filter 15 which passes only the keying frequency and to low pass filter 16 which passes only the sequential audio bits comprising the stereo channels #1 and #2. The keying pulse train comprising positive and negative portions as originally recorded are passed through keying pulse amplifier 17 and applied simultaneously to the inputs of cathode followers 19 and 20 which provide mutual isolation of the resulting two sets of keying pulse trains.

The keying pulse train from the output of the cathode follower 19 passes through the negative pulse clipper 22 which removes the negative portion of the keying pulse cycle, and the positive portion is applied to the screen element of the gated beam tube 24. Simultaneously, the keying pulse cycle comprising negative and positive portions which appears at the output of the cathode follower 20 passes through the keying pulse inverter 21 and appears at the output of the inverter in inverted form, so that the portion of the pulse cycle which originally comprised the negative part of the cycle is now positive and conversely, that portion of the pulse cycle which originally comprised the positive portion of the cycle is now negative.

The inverted pulse cycle is then passed through the negative pulse clipper with only the positive portion of the pulse cycle appearing at the output of the clipping circuit. This positive pulse is applied to the screen element of gated beam tube 25. Simultaneously with the foregoing events, the sequential audio bits are passed through a conventional audio preamplifier where they are applied simultaneously to the control grid elements of gated beam tube 24 and gated beam tube 25. Although the control grid of each gated beam tube receives the same audio bits at any given time, only that tube which simultaneously receives a positive keying pulse will produce an audio output in the form of one audio bit and thus each tube is gated or keyed alternately and each alternate audio bit comprises the output of one of the stereo channels and the remaining or adjacent audio bits comprise the output of the other stereo channel. Each channel therefore, appears as separate and mutually isolated outputs at the plates of the respective gated beam tube. These outputs are applied to the inputs of two separate conventional audio power amplifiers, each of which drives a loudspeaker.

The relationship between a particular audio bit and its respective keying pulse is fixed with respect to time in the recording medium itself so that any particular audio bit is permanently associated with its particular keying pulse during the life of the recording medium. This precludes any erroneous intermixing or crossover of the channels under normal operating conditions. The high pass filter 15 and the low pass filter 16 can be made adjustable so that recordings of any keying pulse frequency can be utilized.

A three position switch can also be incorporated to select either one of the two channels or both simultaneously. This provision will facilitate testing or selecting of either one of two different monaural recordings made on a common recording medium in the same manner as for stereo recordings diclosed herein.

Furthermore, economy and simplicity of the keying operation is achieved by utilizing both the positive and negative portions of the keying pulse cycle and the time difference which normally exists between these two portions of the cycle.

The system of the present invention is not cumbersome and an economy of tape is achieved over the present dual track system. The system of the present invention utilizes only passive circuitry for reproducers, i.e., it does not depend upon the use of pulse generators in reproducing and only one pulse generator is used in recording.

The keying pulses proposed are at an audio frequency normally recorded and within the capabilities of the present art. Only one audio amplifier is required in the system of the present invention to record both channels instead of a separate audio amplifier to record each channel. Furthermore the present invention or system utilizes both the negative and positive portion of the keying pulse cycle in recording and reproducing so as to effectively achieve a doubling of the keying frequency wherein prior systems have used only the positive portion and have had to resort to impractical high keying frequencies.

Figure 3:
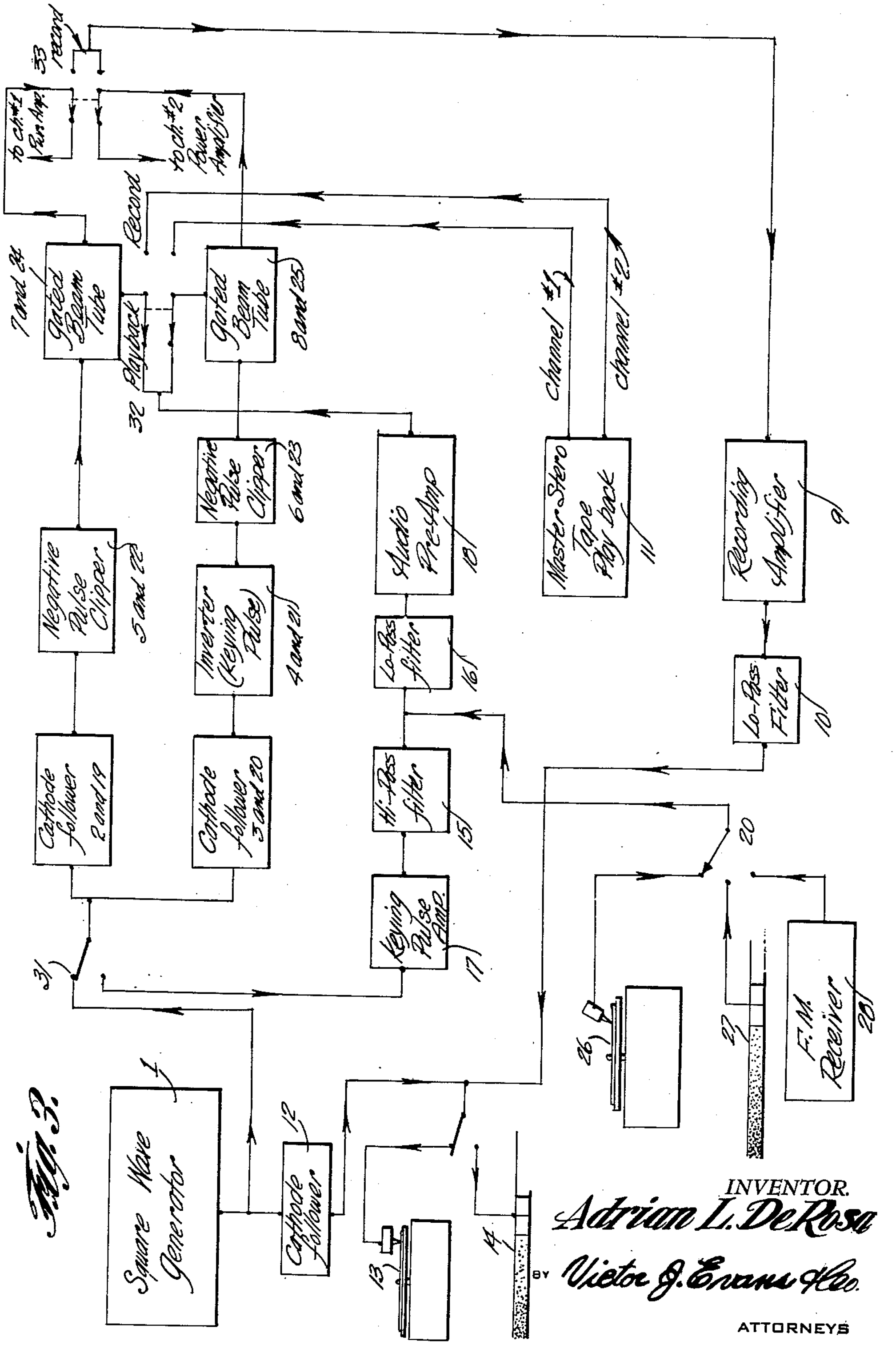
FIGURE 3 is a view illustrating a combined bi-plex stereophonic recording and reproducing system.

Referring now to FIGURE 3 of the drawings, there is shown a block diagram illustrating a combined stereophonic recording and reproducing system. The functions of FIGURES 1 and 2 representing the block diagrams of the reproducing and recording systems described above or previously separately and respectively for purposes of clarity are combined in FIGURE 3 with the addition of conventional switching techniques which provide selection of either the recording or reproducing function. The selection of either the recording or reproducing function is enabled by switches 31, 32 and 33 respectively of FIGURE 3, which switches may be mechanically coupled for simultaneous operation.

In order to avoid repetition or redundancy of description, all numerical notations of associated block functions, with the exception of the above named switches, appearing in FIGURE 3 are identical to those appearing in FIGURES 1 and 2 and likewise the aforesaid descriptions are the same.

The dual numerical notations appearing in certain blocks or in connection with certain blocks of FIGURE 3 represent a dual function of those blocks in that they are identical and perform the same function in recording and reproducing and therefore combine the numerical notation of the respective blocks of FIGURES 1 and 2 in the manner indicated previously.

Minor changes in shape, size and rearrangement of details coming within the field of invention claimed may be resorted to in actual practice, if desired.

I claim:

1. In a bi-plex stereophonic recording system, a square wave generator, first and second cathode followers connected in parallel to one another and in series with the square wave generator, a negative pulse clipper connected to said first cathode follower, a gated beam tube connected to said negative pulse clipper, an inverter connected to said second cathode follower, a negative pulse clipper connected to said inverter, a gated beam tube connected to said last named negative pulse clipper, a master stereo reproducer connected to said pair of gated beam tubes, a recording amplifier connected to the output of said pair of gated beam tubes, a low pass filter connected to said recording amplifier, and a cathode follower connected to said square wave generator and having its output connected to the output of the low pass filter.

2. In a bi-plex stereophonic reproducing system, a selector switch, an output line connected to said selector switch, a high pass filter and a low pass filter connected in parallel one to another and connected in series to said output line, a keying pulse amplifier connected to said high pass filter, first and second cathode followers connected in parallel one to another and in series to the output of said keying pulse amplifier, a negative pulse clipper connected to said first cathode follower, a gated beam tube connected to said negative pulse clipper, a keying pulse inverter connected to said second cathode follower, a negative pulse clipper connected to said keying pulse inverter, a gated beam tube connected to said last named negative pulse clipper, said pair of gated beam tubes being connected in parallel one to the other, and an audio preamplifier connected to said low pass filter and having its output connected to said pair of gated beam tubes.

3. In a bi-plex stereophonic recording and reproducing system, a square wave generator, a record reproducer connected to said square wave generator, first and second cathode followers connected in parallel to one another and in series with the record reproducer, a negative pulse clipper connected to said first cathode follower, a first gated beam tube connected to said negative pulse clipper, an inverter connected to said second cathode follower, a negative pulse clipper connected to said inverter, a second gated beam tube connected to said last named negative pulse clipper, a reproducer connected to said first and second gated beam tubes, an audio preamplifier connected to said reproducer, a low pass filter connected in series to said audio preamplifier, a high pass filter connected to said low pass filter, a keying pulse amplifier connected to said high pass filter and also connected to said record reproducer, a cathode follower connected to said square wave generator, a low pass filter connected to said last named cathode follower, a recording amplifier connected to said last named low pass filter; a master disc cutting head, and a master tape recording head connected between the last named cathode follower and low pass filter; a selector switch connected between said high pass filter and low pass filter, and an FM receiver connected to said selector switch.

References Cited in the file of this patent

UNITED STATES PATENTS

| | | |
|---|---|---|
| 2,444,218 | Cornahan | June 29, 1948 |
| 2,548,531 | Hayes | Apr. 10, 1957 |
| 2,792,449 | Bottini | May 14, 1957 |
| 2,973,509 | Majerus et al. | Feb. 28, 1961 |